H. CAPDEVIELLE.
RESILIENT TIRE.
APPLICATION FILED MAY 20, 1911.
1,089,044.
Patented Mar. 3, 1914.
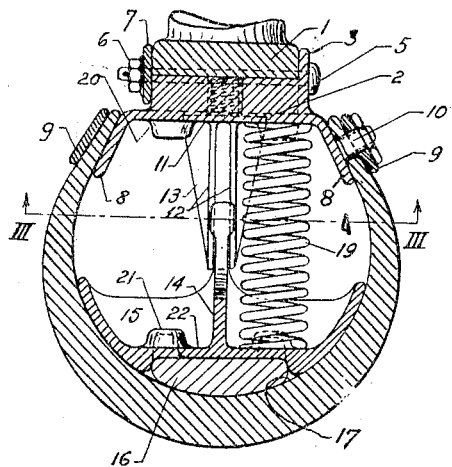
FIG. I
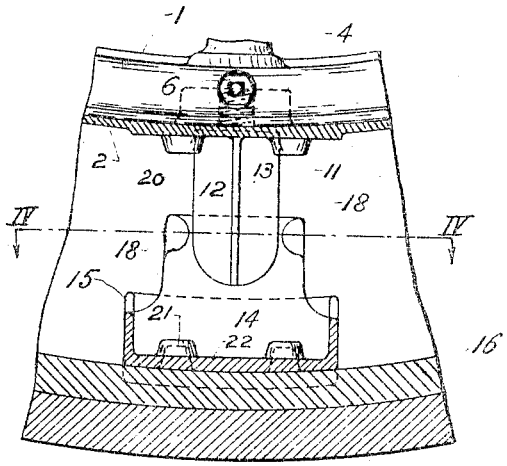
FIG. II
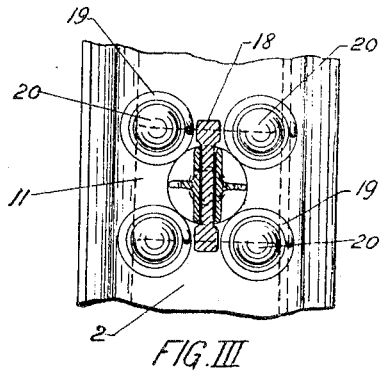
FIG. III
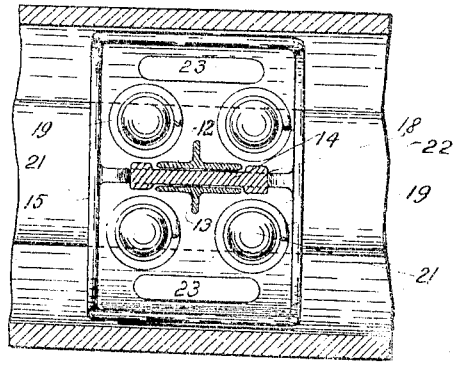
FIG. IV
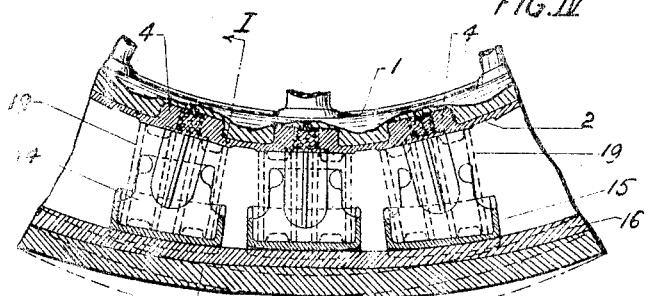
FIG. V
Witnesses
Reginald H. Waters.
Paul T. Trueman.
Inventor
HENRY CAPDEVIELLE
By
Harry A. Styll
Attorney

UNITED STATES PATENT OFFICE.

HENRY CAPDEVIELLE, OF WASHINGTON, DISTRICT OF COLUMBIA.

RESILIENT TIRE.

1,089,044.  Specification of Letters Patent.  Patented Mar. 3, 1914.

Application filed May 20, 1911. Serial No. 628,473.

*To all whom it may concern:*

Be it known that I, HENRY CAPDEVIELLE, a citizen of the United States, residing at Washington, in the District of Columbia, have invented certain new and useful Improvements in Resilient Tires, of which the following is a specification.

My invention relates to improvements in resilient tires and has for its object to provide an improved construction of resilient tire particularly intended for use in connection with motor cars but applicable also to other uses.

My invention comprises a series of members projecting outwardly from a wheel rim plate and slidingly engaging inwardly extending members on shoe plates which shoe plates are adapted to conform to and bear on the inner surface of the flexible envelop or tire; springs between the rim and shoe plates adapted to hold the flexible envelop or tire in extended position and elastic means adapted to hold the shoe plates in circumferential alinement.

The principal object of my invention is to provide an arrangement of the springs and their holding structures whereby the load will be distributed among the adjacent springs as the spring holding means adapts itself to the compression of that portion of the tire which comes in contact with the ground as the tire revolves.

Another object of my invention is to provide means for allowing longitudinal displacement of the shoes and springs without consequent creeping.

Another object of my invention is to provide an additional resilient member on the inner surface of the tire which will be adapted to hold the shoe plates in circumferential alinement.

Another object of my invention is to provide means for preventing lateral deflections of the shoe plates and consequent collapse of the tire when skidding or subjected to side thrusts.

With these and other objects in view the invention consists in the novel construction and arrangement of parts hereinafter described, delineated in the drawings and specifically claimed, it being understood that changes properly falling within the scope of what is claimed may be made without departing from the spirit of my invention.

Similar numerals of reference are employed to denote corresponding parts throughout the several figures of the drawings.

In the accompanying drawings: Figure I is a radial cross section through the envelop and rim of the wheel taken on line I—I Fig. V. The spring seat members or shoes are shown engaged with the extending members of the rim, one spring being shown in place. Fig. II is a longitudinal section through the envelop and rim showing the same features as Fig. I but with the springs removed. Fig. III is in part a top or plan view and in part a horizontal section on line III—III of Fig. I showing in section the rim extending members engaging the shoe. The section is taken on a plane looking toward the rim of the wheel as indicated by arrows in Fig. I. Fig. IV is in part a plan view of one of the shoes and in part a horizontal section taken on line IV—IV of Fig. II. The section is taken on a plane looking toward the shoe or toward the envelop of the tire, as indicated by the arrows. Fig. V shows a longitudinal view of the wheel in vertical section through the rim and tire, illustrating the action of the shoes when the load compresses one set of springs, the two adjacent shoes being brought into action.

Referring specifically to the drawings: To the felly 1 of the wheel is secured a rim plate 2 which has a vertical flange 3 fitted to the inner side of the felly. A plurality of transverse bosses 4 on the rim 2 project into corresponding recesses in the felly and prevent creeping of the rim plate thereon. The rim plate is held in place on the felly by means of bolts 5 which pass through the vertical flange 3 and the felly, being retained in place by nuts 6, and a locking plate 7 fitted to the outer side of the felly, as shown in Fig. I. The envelop or tire 23 is secured to depending flanges 8 on the rim plate by means of locking plates 9 and bolts 10, as indicated in Fig. I.

The envelop or tire is held extended as follows: On the under side of the rim plate is a plurality of outwardly extending bosses 11, to each of which is secured an extension member 12, which is bifurcated or divided longitudinally. If desired this extension member may be stiffened by brackets 13 or other means to prevent lateral deflection or distortion. The extension member embraces between its divided portion a flange 14 attached to a shoe 15 which conforms to a portion of the inner surface of the tire, as shown in Figs. I and II. These shoes are spaced at determined intervals around the inner side of the envelop and held in circumferential alinement by an elastic member 16 adapted to fit in recesses 17 on the under side of the shoes; on the sides of the shoe flange 14 which engages the rim extension member 12 are rounded bearing surfaces 18 which allows the shoe to have a longitudinal oscillatory and sliding movement with relation to the rim extension member. These bearings prevent the shoes from slipping out of the divided portions of the rim extension members and the consequent creeping of the shoes in the envelop or tire and also permit an oscillatory sliding movement between the shoe and divided members. The divided portions of the rim extension members also prevent lateral deflection of the shoes. The springs 19, which hold the shoes extended on the rim extension member are held in place and compressed between dowel shaped projections 20, on the bosses 11 of the rim plate, and corresponding and opposed projections 21, on bosses 22 on the shoes. The parts may be lightened by any suitably arranged lightening holes 23 and the extending members stiffened as required.

The parts are assembled as follows: The extension members 12 are attached to the bosses 11 of the flanged rim plate, the springs 19 inserted over the projecting dowel 21 on the shoe plate, the shoe flanges pushed into the divided portions of the extension members 12 of the rim plate. The shoe is then pushed upward on the extension member 12 until the upper end of the spring is pushed over the projecting dowel 20 of the rim plate. The elastic ring 16 is then sprung over the shoes and into the recesses 17 therein, thereby holding the shoes in place on the extension members. The flexible cover or envelop is next put in place over the shoes and the ends secured to the depending flanges on the rim plate as shown in Fig. I.

The operation is as follows: The envelop or tire is held extended by the shoes which are pressed outwardly by the action of the springs, the vertical flange of the shoes working back and forth in the divided portion of the extension members 12 of the rim plates as pressure is applied or relieved during the revolutions of the wheel, the cushioning effect of resilient tires being obtained thereby. As the shoes are independent of each other, local yielding or compression is allowed as the load is applied. When the load compresses one or more shoes, the two adjacent shoes are brought into action as shown in Fig. V, a certain amount of sliding longitudinal oscillatory displacement of the shoe being permitted without creeping in the tire, thereby distributing the load and preventing any one set of the springs being over taxed through the forward motion of the car or when the car is stationary and the load distributed to the two adjacent shoes. The rounded bearing portions 18 allow a rocking motion of the shoe in the direction of the circumference of the wheel. These portions engage the edges of the extension member 12 extending from the tire rim and oscillate thereon, thereby preventing the shoe from creeping around the inner surface of the tire and from getting out of alinement with the extension member. If lateral forces are generated by the sliding or skidding of the wheels the long overlapping bearing between the extension members of the rim plate and the vertical flanges of the shoes will prevent lateral displacement of the shoe plates and the consequent deflection and tearing off of the envelop, which construction in conjunction with the means for allowing longitudinal sliding oscillatory displacement without creeping, is a novel feature of my invention.

Having now described my invention, the following is what I claim as new therein and desire to secure by Letters Patent:

1. A shoe plate for a resilient tire comprising a circumferential portion adapted to fit the inner curvature of the tire, an inwardly extending longitudinal flange, and laterally projecting rounded bearing shoulders adjacent the inner end of the inwardly extending flange substantially as shown and described.

2. In a resilient tire a wheel rim comprising a circumferential portion adapted to fit the felly and a plurality of outwardly extending separated members divided longitudinally; and a shoe plate comprising a circumferential portion adapted to fit the inner curvature of the tire and an inwardly extending longitudinal flange fitting between the halves of the separated member on the rim and having fixed rounded bearing shoulders adjacent its inner ends adapted to slidingly and oscillatingly engage the edges of the divided member of the wheel rim.

In testimony whereof I affix my signature in presence of two witnesses.

HENRY CAPDEVIELLE.

Witnesses:
J. L. JONES,
R. M. STRICKLAND.